(12) United States Patent
Kaanta et al.

(10) Patent No.: US 9,190,682 B2
(45) Date of Patent: Nov. 17, 2015

(54) FUEL CELL SYSTEM HAVING A SAFETY MODE

(71) Applicant: Lilliputian Systems, Inc., Wilmington, MA (US)

(72) Inventors: Bradley C. Kaanta, Cambridge, MA (US); Jacob P. Lipcon, Arlington, MA (US); Alan P. Ludwiszewski, Andover, MA (US)

( * ) Notice: Subject to any disclaimer, the term of this patent is extended or adjusted under 35 U.S.C. 154(b) by 179 days.

(21) Appl. No.: 13/734,857

(22) Filed: Jan. 4, 2013

(65) Prior Publication Data

US 2014/0191733 A1 Jul. 10, 2014

(51) Int. Cl.
| | |
|---|---|
| H01M 8/06 | (2006.01) |
| H01M 8/04 | (2006.01) |
| H02J 7/34 | (2006.01) |
| H02J 1/00 | (2006.01) |

(52) U.S. Cl.
CPC ...... *H01M 8/04664* (2013.01); *H01M 8/04298* (2013.01); *H01M 8/04604* (2013.01); *H01M 8/04955* (2013.01); *H02J 7/34* (2013.01); *H01M 8/04992* (2013.01); *H01M 2250/20* (2013.01); *H02J 1/00* (2013.01); *H02J 2001/004* (2013.01); *Y02E 60/50* (2013.01)

(58) Field of Classification Search
CPC ............ H01M 2250/20; H01M 8/04298; H01M 8/04604; H01M 8/04664; H01M 8/04955; H02J 1/00; H02J 2001/004; H02J 7/34; Y02E 60/50

USPC ................... 429/427, 428, 429, 430
See application file for complete search history.

(56) References Cited

U.S. PATENT DOCUMENTS

2011/0210746 A1* 9/2011 Yugou et al. ........... 324/427

\* cited by examiner

*Primary Examiner* — Patrick Ryan
*Assistant Examiner* — Ben Lewis
(74) *Attorney, Agent, or Firm* — Sunstein Kann Murphy & Timbers LLP

(57) ABSTRACT

A fuel cell system for providing power to a load, and having a safety mode, is disclosed. The system includes a fuel cell configured to convert fuel to electrical power and coupled so as to provide electrical power at a fuel cell power output, a system power port having a power connection and a data connection, configured to be reversibly coupled to the load, a power connection controller, coupled to the fuel cell power output and to the system power port, and configured to enable and disable the power connection, and a fuel cell system controller coupled to the fuel cell, the data connection and the power connection controller. The fuel cell system controller has a normal mode and a safety mode. A user selection determines whether the fuel cell system controller is in the normal mode or the safety mode. If the load has a smart power port, the data connection is configured to communicate over the smart power port. In the normal mode, the fuel cell system controller is configured to enable the power connection independent of the data connection. In the safety mode, the fuel cell system controller is configured to enable the power connection only when an approved communication is received over the data connection from the load. A related method for operating the fuel cell system is also disclosed.

9 Claims, 4 Drawing Sheets

FUEL CELL SYSTEM HAVING A SAFETY MODE

CROSS REFERENCE TO RELATED APPLICATIONS

The present application is related to U.S. patent application Ser. No. 13/734,895, filed on Jan. 4, 2013, U.S. patent application Ser. No. 13/734,835, filed on Jan. 4, 2013, U.S. patent application Ser. No. 13/734,848, filed on Jan. 4, 2013, U.S. patent application Ser. No. 13/734,854, filed on Jan. 4, 2013, U.S. patent application Ser. No. 13/734,911, filed on Jan. 4, 2013, U.S. patent application Ser. No. 13/734,884, filed on Jan. 4, 2013, and U.S. patent application Ser. No. 13/734,888, filed on Jan. 4, 2013, the disclosures of which are incorporated by reference herein in their entirety.

TECHNICAL FIELD

The present invention relates to fuel cell systems, and more specifically to portable fuel cell systems that can be safely used when charging electronic devices in various types of public transportation such as airplanes, commuter trains, or the like.

BACKGROUND ART

Fuel cells that operate in conjunction with replaceable fuel canisters or cartridges filled with, for example, gaseous hydrogen, methanol, butane or diesel fuel, are a developing technology. These types of fuel cells are designed to compete with the various battery solutions that power consumer products. The competitiveness of these fuel cells with regard to batteries depends on a number of factors, such as the energy density of the fuel in the canister; the ability of the fuel cell to convert chemical energy to electrical energy with certain efficiencies; and the need to keep the fuel cell stack, along with associated fluid pumping and power control components, no larger than that of a competitive battery.

One possible use of portable fuel cell systems is to recharge batteries while the consumer is engaged in various other activities. Any time batteries are being recharged there is an elevated risk that the battery will fail catastrophically in a variety of ways, including possible fire. This catastrophic failure is very rare, and the risk it poses is generally considered acceptable in most situations where batteries are currently plugged into the wall. The availability of a portable fuel cell system potentially allows this risk to be present in environments where battery charging has not historically been possible. For example, unattended charging in a suitcase on an airplane is now technologically possible.

In some safety critical environments, it is desirable to have a portable fuel cell system which is of a type that will not charge batteries when an attached portable electronic device is not in use. This standard is currently a requirement in the United States of America for fuel cell systems used on commercial aircraft as specified in the Code of Federal Regulations 49 C.F.R. §175.10(a)(19)(ix).

SUMMARY OF THE EMBODIMENTS

According to one embodiment of the present invention, a fuel cell system for charging a load, and having a safety mode, is disclosed. The system includes a fuel cell configured to convert fuel to electrical power and coupled so as to provide electrical power at a fuel cell power output, and a system power port having a power connection and a data connection, configured to be reversibly coupled to the load. The system further includes a power connection controller, coupled to the fuel cell power output and to the system power port, and configured to enable and disable the power connection. The system also includes a fuel cell system controller coupled to the fuel cell, the data connection and the power connection controller. The fuel cell system controller has a normal mode and a safety mode, wherein a user selection determines whether the fuel cell system controller is in the normal mode or the safety mode. If the load has a smart power port, the data connection is configured to communicate over the smart power port. In the normal mode, the fuel cell system controller is configured to enable the power connection independent of the data connection, and, in the safety mode, the fuel cell system controller is configured to enable the power connection only when an approved communication is received over the data connection from the load.

In accordance with another embodiment of the invention, a method for operating a fuel cell system having a safety mode includes detecting a switch configuration of the fuel cell system, the switch configuration selected from a first switch configuration and a second switch configuration. The fuel cell system having a fuel cell and a fuel cell system controller coupled to the fuel cell and configured to place the fuel cell system in a normal mode or in the safety mode. The fuel cell system provides power to a load. The method further includes placing the fuel cell system, via operation of the fuel cell system controller, in the normal mode if the first switch configuration is detected or in the safety mode if the second switch configuration is detected. The method further includes, when the fuel cell system is in the normal mode, enabling the fuel cell system to charge the load, and, when the fuel cell system is in the safety mode, enabling the fuel cell system to detect a connection between the fuel cell system and the load. If the connection is detected, and if an approved communication is received from the load, enabling the fuel cell system to charge the load. In related embodiments, detecting the switch configuration includes detecting a state of a user settable switch. The approved communication may be a signal from the load that indicates that the load is in use by a user. The approved communication may be a handshake signal from the load. The approved communication from the load may be an identifier of a device. The identifier of the device may be required by the fuel cell system controller to correspond with an item on a list of identifiers stored in the fuel cell system. The method may further include, when the fuel cell system controller is in the safety mode, enabling the fuel cell system controller to stop operation of the fuel cell when no approved communication has been received from the load. The fuel cell system may further include a visual indicator configured to have a first appearance when the fuel cell system controller is in the normal mode and a second appearance when the fuel cell system controller is in the safety mode.

According to another embodiment of the present invention, a fuel cell system for providing power to a load, and having a safety mode, is disclosed. The system includes a fuel cell configured to convert fuel to electrical power and coupled so as to provide electrical power at a fuel cell power output, a system power port having a power connection and a data connection, configured to be reversibly coupled to the load. The system further includes a power connection controller, coupled to the fuel cell power output and to the system power port, and configured to enable and disable the power connection. The system also includes a fuel cell system controller coupled to the fuel cell, the data connection and the power connection controller, and a sensor coupled to the fuel cell system controller. The fuel cell system controller has a normal mode and a safety mode, and is configured to use information from the sensor to determine whether the fuel cell system controller is in the normal mode or the safety mode. If the load has a smart power port, the data connection is configured to communicate over the smart power port. In the normal mode, the fuel cell system controller is configured to enable the power connection independent of the data connection, and, in the safety mode, the fuel cell system controller is configured to enable the power connection only when an approved communication is received over the data connection from the load.

In related embodiments, the fuel cell system may further include a switch having a first switch configuration and a second switch configuration, wherein system selection between the normal mode and the safety mode is determined by the system selection between the first switch configuration and the second switch configuration.

Illustrative embodiments of the invention may be implemented as a computer program product having a computer usable medium with computer readable program code thereon. The computer readable code may be read and utilized by a computer system in accordance with conventional processes.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "smart power port" in a device is a port, in the device, that receives a power input and includes a bus for data communication.

A "fuel cell" is any portion of the system containing at least part of the electrochemical conversion structures, including an anode, electrolyte and cathode, and also including portions of the housings, flow conduits, electronics, and other associated peripheral components coupled to the electrochemical structures.

A fuel cell is "coupled" to a power output if it directly provides electrical power at the power output or indirectly provides electrical power at the power output, as, for example, via a rechargeable battery.

A "switch" includes a software operable switch and/or a hardware operable switch, and also includes setting the configuration of the system electronically through a data connection with another device.

Embodiments of the present invention provide a portable fuel cell system which has at least two operating modes, a first "normal" mode where the system provides power to any device, and a second "safety" mode where the system will not charge batteries in an attached portable electronic device that is not in use. In addition, a user-friendly operation of the system provides seamless switching of the system from the normal mode to the safety mode.

Figure 1A:
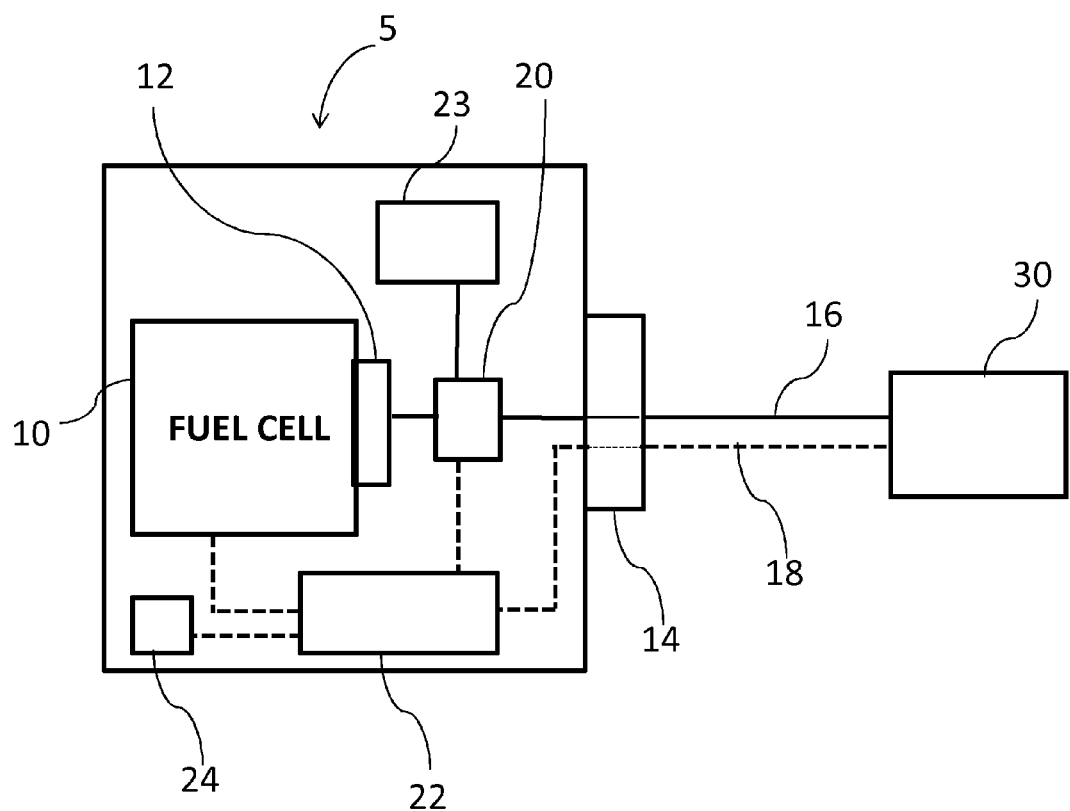
FIG. 1A is a schematic diagram of a portable fuel cell system having a safety mode according to an illustrative embodiment of the present invention.

FIG. 1A illustrates one exemplary embodiment of fuel cell system 5 for charging load 30, and having a safety mode. The fuel cell system 5 includes fuel cell 10 configured to convert fuel to electrical power and coupled so as to provide electrical power at fuel cell power output 12. The fuel cell system 5 further includes system power port 14 having power connection 16 and data connection 18, configured to be reversibly coupled to the load 30. The fuel cell system 5 further includes power connection controller 20, coupled to the fuel cell power output 12 and to the system power port 14, and configured to enable and disable the power connection 16. The fuel cell system 5 also includes fuel cell system controller 22 coupled to the fuel cell 10, the data connection 18 and the power connection controller 20. The fuel cell system controller 22 has a normal mode and a safety mode, wherein a user selection determines whether the fuel cell system controller 22 is in the normal mode or the safety mode. The fuel cell 10 can, in one embodiment, provide electrical power to an optional internal rechargeable battery 23, which may be coupled to the power connection controller 20. In use, the power port 14 is coupled to a load 30 using the power connection 16 and, in some embodiments, the data connection 18. The fuel cell system 5 may further include switch 24, which has a first switch configuration and a second switch configuration. The fuel cell system controller 22 determines whether to select the first "normal" mode or the second "safety" based on whether a user selects the first switch configuration or the second switch configuration.

Figure 1B:
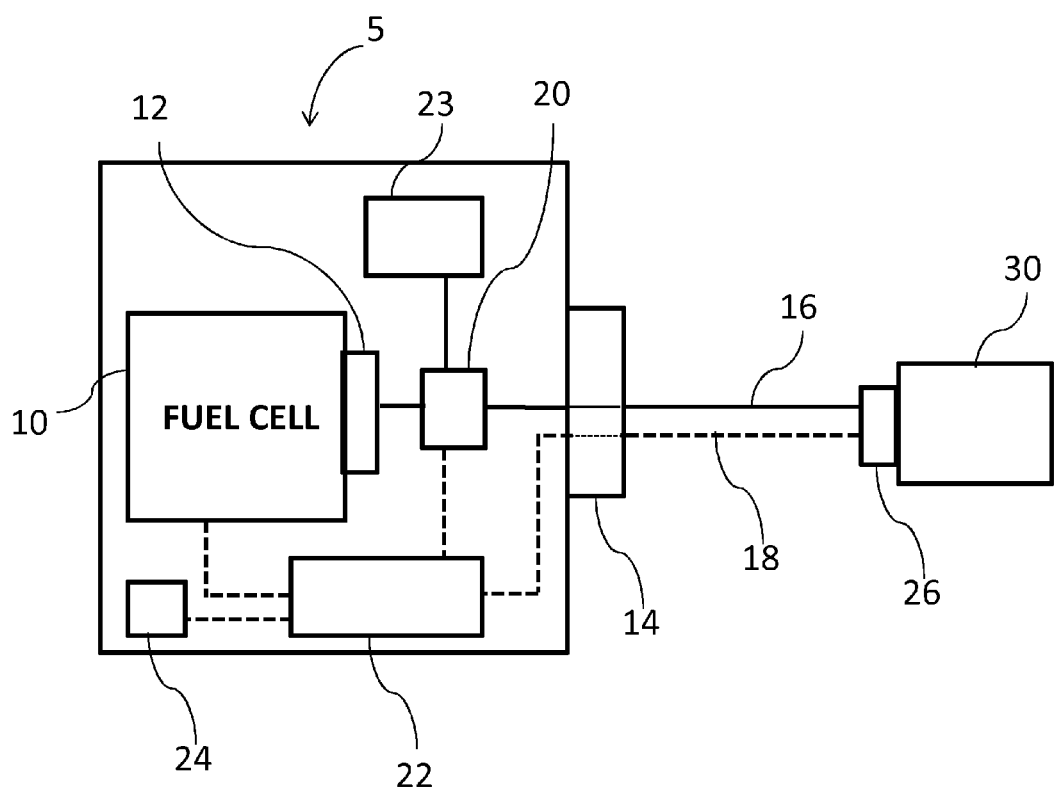
FIG. 1B is a schematic diagram of a portable fuel cell system according to an illustrative embodiment of the present invention, showing a load having a smart power port.

FIG. 1B illustrates one embodiment of the fuel cell system 5, wherein the load 30 has a smart power port 26, and the data connection 18 is configured to communicate through the smart power port 26.

In the normal mode of an exemplary embodiment of the fuel cell system 5, the fuel cell system controller 22 is configured to enable the power connection 16 independent of the data connection 18, and, in the safety mode, the fuel cell system controller 22 is configured to enable the power connection 16 only when an approved communication is received over the data connection 18 from the load 30.

The system power port 14 can be of a type compatible with Universal Serial Bus (USB) standards. The approved communication can be a signal from the load 30 that indicates that the load is in use. The approved communication may be a handshake signal from the load 30 that indicates that the attached device is responsive and not powered off. Alternatively, or in addition, the approved communication from the load 30 may be an identifier of a device. The device can be any type of electronic device such as personal computer, laptop, tablet, smart phone, personal digital assistant (PDA), electronic reader, or any other consumer electronic device such as electric shaver, a flashlight, portable CD player, MP3 player, etc. The identifier of the device can be required by the fuel system controller 22 to correspond with an item on a list of identifiers stored in the system 5 in order to establish the device as an approved type. The fuel cell system controller 22 may be further configured, in the safety mode, to stop operation of the fuel cell 10 when no approved data connection is present.

The fuel cell system 5 can further include a visual indicator (not shown) configured to have a first appearance when the fuel cell system 5 is in the normal mode and a second appearance when the fuel cell system 5 is in the safety mode. The visual indicator is implemented to provide a visual indication of an operative state of the device. This is useful for demonstrating that the device is in the proper operating mode when using the device in a regulated environment, such as on a commercial aircraft. The visual indication may be included in a display that functions by any of a variety of suitable mechanisms, such as by use of electrochromic materials, thermochromic materials, liquid crystals, light-emitting diodes, and/or chemically reactive materials. The visual indication may be mechanically exposed by the action of a physical switch. The visual indication may include any of a wide variety of human-readable or machine-readable indications, including words, symbols, colors or other human-readable or machine-readable indicia.

Figure 1C:
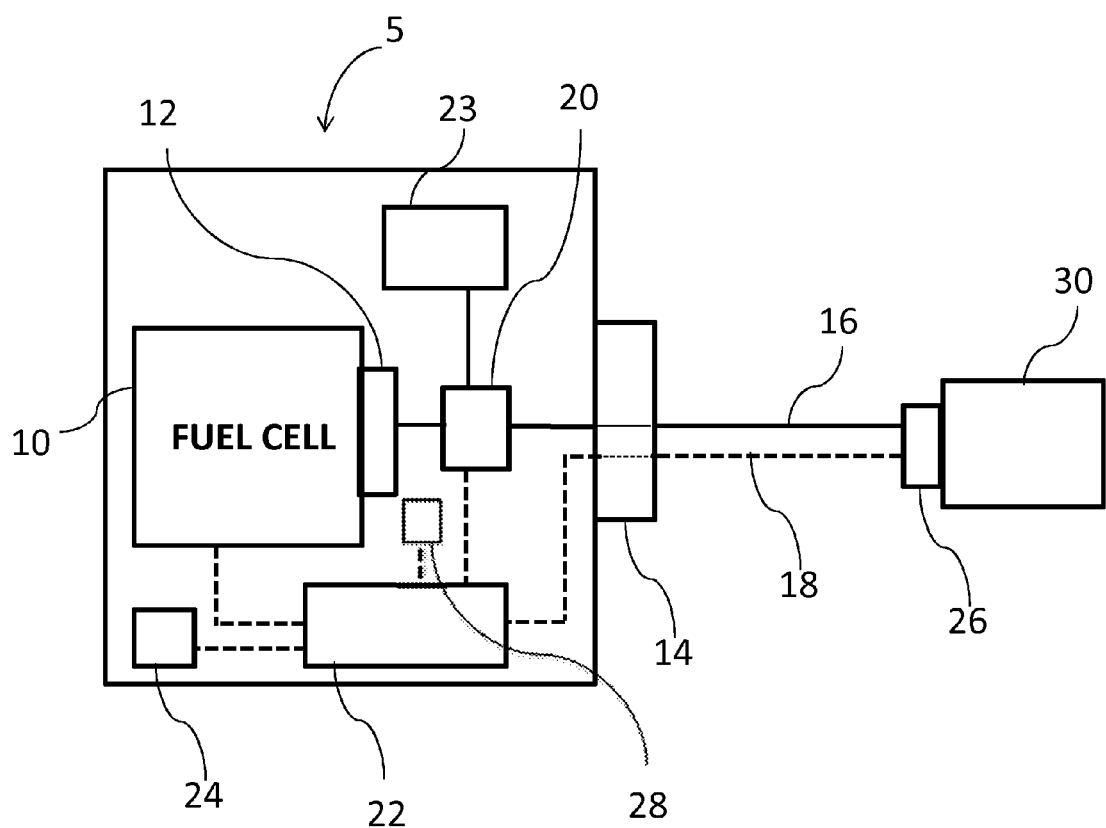
FIG. 1C is a schematic diagram of a portable fuel cell system having a safety mode and a sensor according to an illustrative embodiment of the present invention.

In some embodiments of the present invention, as shown in FIG. 1C, the fuel cell system 5, can further include a sensor 28 coupled to the fuel cell system controller 22, such that the fuel cell system controller 22 is configured to use information from the sensor 28 to set whether the fuel cell system 5 is in the normal mode or the safety mode. In some embodiments, the fuel cell system controller 22 can be configured to set the state of the fuel cell system 5 in response to the rate of the pressure drop in an airplane cabin as a flight climbs after takeoff. In another embodiment, the fuel cell system controller 22 can be configured to set the state of the fuel cell system 5 in response to detecting a wireless communication signal. Embodiments of the fuel cell system 5 including the sensor 28 may be configured to connect to the load 30 having the smart power port 26, as shown in FIG. 1C, or may be configured to connect to the load 30 without a smart power port 26, such as shown in FIG. 1A.

Figure 2:
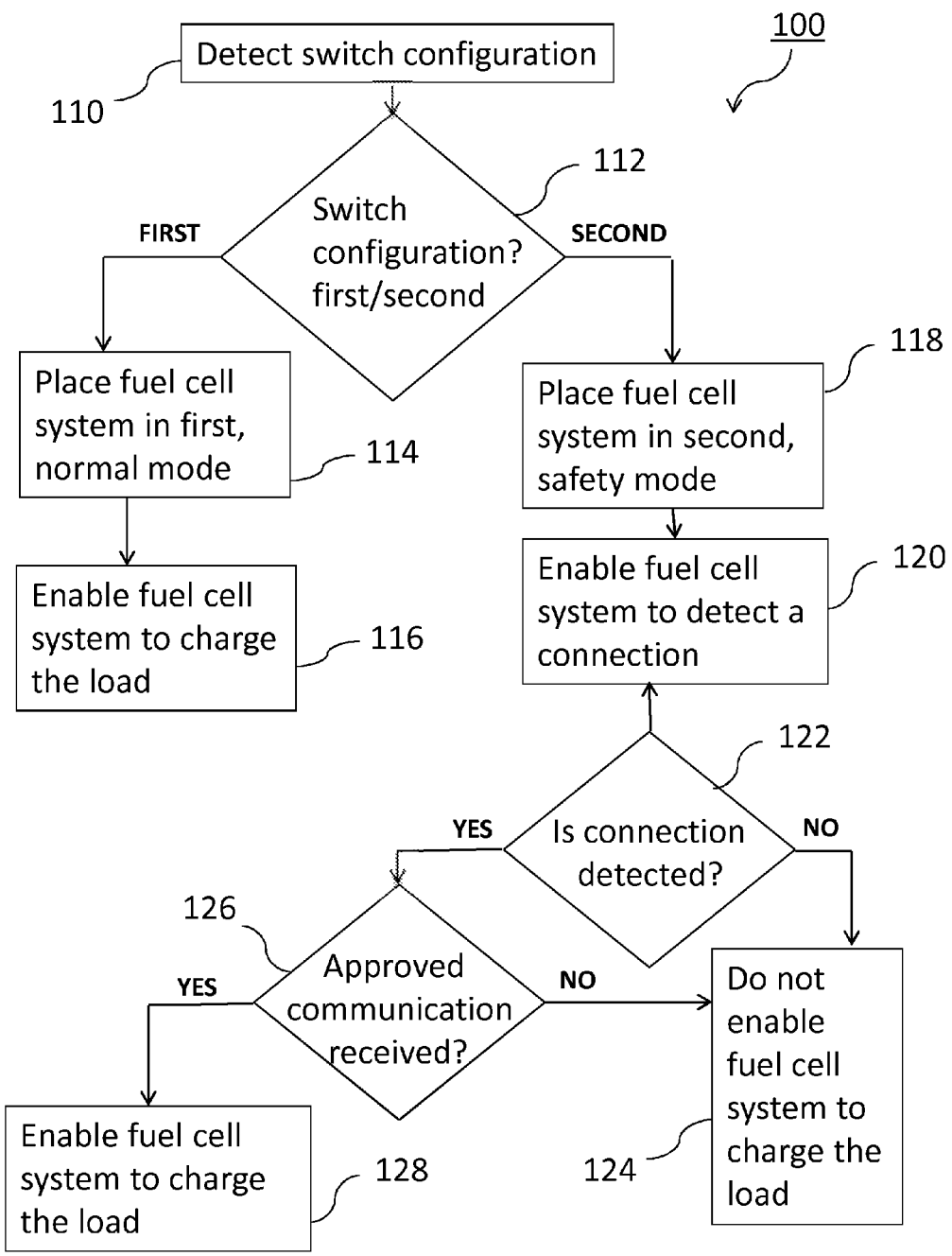
FIG. 2 is a flow chart showing a process of operating a fuel cell system having a safety mode according to an illustrative embodiment of the present invention.

FIG. 2 is a flow chart showing a process 100 of operating a fuel cell system, which may be implemented by the fuel cell system controller 22. The process 100 begins by detecting a switch configuration of the fuel cell system 5 in process 110. The switch configuration may be selected from a first switch configuration and a second switch configuration in process 112, although additional configurations may also be available and selected. If the first switch configuration is detected, then the fuel cell system controller 22 places the fuel cell system 5 in the first, normal mode (process 114) and enables the fuel cell system 5 to charge the load 30 (process 116). If the second switch configuration is detected in process 112, then the fuel cell system controller 22 places the fuel cell system 5 in the second, safety mode (process 118) and enables the fuel cell system 5 to detect a connection (process 120). If the connection is not detected in process 122, then the fuel cell system controller 22 does not enable the fuel cell system 5 to charge the load in process 124. However, if the connection is detected in process 122, then the fuel cell system controller 22 verifies whether an approved communication has been received in process 126. As mentioned above, the approved communication may be a variety of different communications, e.g., a signal from the load 30, a handshake signal from the load 30, an identifier of a device, etc. If no approved communication is received, then the fuel cell system controller 22 does not enable the fuel cell system 5 to charge the load 30 in process 124. If an approved communication is received in process 126, then the fuel cell system controller 22 enables the fuel cell system 5 to charge the load 30 in process 128.

Some embodiments of the fuel cell system controller 22 may be implemented as hardware, software (e.g., a computer program product), or a combination of both software and hardware. For example, embodiments may be implemented as a computer program product for use with a computer system. Such implementation may include a series of computer instructions or program code fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the fuel cell system controller. Those skilled in the art should appreciate that such computer instructions may be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The embodiments of the invention described above are intended to be merely exemplary; numerous variations and modifications will be apparent to those skilled in the art. All such variations and modifications are intended to be within the scope of the present invention as defined in any appended claims. For example, although some features may be included in some embodiments and drawings and not in others, these features may be combined with any of the other features in accordance with embodiments of the invention as would be readily apparent to those skilled in the art based on the teachings herein.

What is claimed is:

1. A method of operating a fuel cell system having a safety mode, the fuel cell system having a fuel cell and a fuel cell system controller coupled to the fuel cell and configured to place the fuel cell system in a normal mode or in the safety mode, the fuel cell system providing power to a load, the method comprising:
    detecting a switch configuration of the fuel cell system, the switch configuration selected from a first switch configuration and a second switch configuration;
    placing the fuel cell system, via operation of the controller, in the normal mode if the first switch configuration is detected or in the safety mode if the second switch configuration is detected;
    when the fuel cell system is in the normal mode, enabling the fuel cell system to charge the load; and
    when the fuel cell system is in the safety mode,
        enabling the fuel cell system to detect a connection between the fuel cell system and the load; and
        if the connection is detected, and if an approved communication is received from the load, enabling the fuel cell system to charge the load.

2. A method according to claim 1, wherein detecting the switch configuration includes detecting a state of a user settable switch.

3. A method according to claim 1, wherein the approved communication is a signal from the load that indicates that the load is in use by a user.

4. A method according to claim 1, wherein the approved communication is a handshake signal from the load.

5. A method according to claim 1, wherein the approved communication from the load is an identifier of a device.

6. A method according to claim 5, wherein the identifier of the device is required by the fuel cell system controller to correspond with an item on a list of identifiers stored in the fuel cell system.

7. A method according to claim 1, further comprising, when the fuel cell system controller is in the safety mode, enabling the fuel cell system controller to stop operation of the fuel cell when no approved communication has been received from the load.

8. A method according to claim 1, further comprising activating a visual indicator configured to have a first appearance when the fuel cell system controller is in the normal mode and a second appearance when the fuel cell system controller is in the safety mode.

9. A computer program product for operating a fuel cell system having a safety mode, the fuel cell system having a fuel cell and a fuel cell system controller coupled to the fuel cell and configured to place the fuel cell system in a normal mode or in the safety mode, the fuel cell system providing power to a load, the fuel cell system controller implementing the computer program product comprising a computer usable medium having computer readable and executable program code thereon, the computer readable program code comprising:

program code for detecting a switch configuration of the fuel cell system, the switch configuration selected from a first switch configuration and a second switch configuration;

program code for placing the fuel cell system in the normal mode if the first switch configuration is detected or in the safety mode if the second switch configuration is detected;

program code for enabling the fuel cell system to charge the load when the fuel cell system is in the normal mode; and program code for enabling the fuel cell system to detect a connection between the fuel cell system and the load when the fuel cell system is in the safety mode, and if the connection is detected, and if an approved communication is received from the load, enabling the fuel cell system to charge the load.

* * * * *